(12) United States Patent
Parent et al.

(10) Patent No.: US 7,395,275 B1
(45) Date of Patent: Jul. 1, 2008

(54) SYSTEM AND METHOD FOR DISPOSING OF ASSETS

(75) Inventors: Brent C. Parent, Holland, OH (US);
Andy F. Suhy, Jr., Perrysburg, OH (US);
Aaron J. Roth, Sylvania, OH (US);
Patrick O'Brien, Maumee, OH (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 1206 days.

(21) Appl. No.: 09/503,671

(22) Filed: Feb. 14, 2000

Related U.S. Application Data

(63) Continuation-in-part of application No. 09/441,289, filed on Nov. 16, 1999, now Pat. No. 7,062,446.

(60) Provisional application No. 60/166,042, filed on Nov. 17, 1999.

(51) Int. Cl.
*G06F 17/00* (2006.01)

(52) U.S. Cl. .............. 707/104.1; 705/7

(58) Field of Classification Search .......... 705/10, 705/26, 27, 37, 1, 7; 707/1, 10, 104.1
See application file for complete search history.

(56) References Cited

U.S. PATENT DOCUMENTS

| | | | | |
|---|---|---|---|---|
| 4,383,298 A | * | 5/1983 | Huff et al. | 705/28 |
| 4,946,169 A | * | 8/1990 | Hofmann | 273/253 |
| 5,168,445 A | | 12/1992 | Kawashima et al. | |
| 5,450,317 A | * | 9/1995 | Lu et al. | 705/10 |
| 5,682,142 A | | 10/1997 | Loosmore et al. | 340/572 |
| 5,732,401 A | * | 3/1998 | Conway | 705/29 |
| 5,737,215 A | | 4/1998 | Schricker et al. | 364/149 |
| 5,774,873 A | * | 6/1998 | Berent et al. | 705/26 |
| 5,778,381 A | * | 7/1998 | Sandifer | 707/104.1 |
| 5,802,500 A | | 9/1998 | Ryan et al. | 705/36 |

(Continued)

FOREIGN PATENT DOCUMENTS

GB 2 308 947 A 9/1997

(Continued)

OTHER PUBLICATIONS

"Vacation Harber Becomes the Newest Member of the Fairmarket Auction Network", Nov. 2, 1999, Business Wire.*

(Continued)

*Primary Examiner*—Andrew Joseph Rudy
(74) *Attorney, Agent, or Firm*—MacMillan, Sobanski & Todd, LLC

(57) ABSTRACT

A system for managing assets, and facilitating electronic commerce respecting the assets includes a computerized database for storing asset profiles for a plurality of assets. The asset profiles, each include an asset specification and a bid definition. The asset specification includes maintenance history data for the asset and the bid definition outlines the bounds for one of sale, rental or lease of the asset. Users of the system may search the database remotely over the Internet for desired assets, and retrieve detailed information, such as maintenance history, and then bid on the asset for purchase, rental, or lease. Users can also add their own assets to the database for search by others. The system also includes a fantasy fleet feature for conducting "what if" analyses of a simulated fleet containing existing assets and proposed assets.

27 Claims, 11 Drawing Sheets

U.S. PATENT DOCUMENTS

| | | | | |
|---|---|---|---|---|
| 5,832,069 | A | | 11/1998 | Waters et al. ............... 379/115 |
| 5,904,727 | A | | 5/1999 | Prabhakaran ............... 701/208 |
| 5,922,040 | A | | 7/1999 | Prabhakaran ............... 701/117 |
| 5,965,858 | A | * | 10/1999 | Suzuki et al. ................. 705/29 |
| 5,987,474 | A | * | 11/1999 | Sandifer .................. 707/104.1 |
| 5,995,947 | A | * | 11/1999 | Fraser et al. .................. 705/38 |
| 6,170,742 | B1 | * | 1/2001 | Yacoob ...................... 235/375 |
| 6,237,786 | B1 | * | 5/2001 | Ginter et al. ................ 213/153 |
| 6,292,806 | B1 | * | 9/2001 | Sandifer .................. 707/104.1 |
| 6,347,302 | B1 | | 2/2002 | Joao ............................ 705/35 |
| 6,366,220 | B1 | * | 4/2002 | Elliott ........................ 340/928 |
| 6,502,080 | B1 | | 12/2002 | Eichorst et al. ............. 705/400 |
| 6,619,406 | B1 | * | 9/2003 | Kacyra et al. ................ 172/4.5 |
| 6,735,630 | B1 | * | 5/2004 | Gelvin et al. ............... 709/224 |
| 7,020,701 | B1 | * | 3/2006 | Gelvin et al. ............... 709/224 |
| 7,062,446 | B1 | * | 6/2006 | Suhy, Jr. et al. ................ 705/1 |
| 7,124,101 | B1 | * | 10/2006 | Mikurak ...................... 705/35 |
| 7,130,807 | B1 | * | 10/2006 | Mikurak ........................ 705/7 |
| 7,152,035 | B1 | * | 12/2006 | Suhy, Jr. ........................ 705/1 |
| 7,155,401 | B1 | * | 12/2006 | Cragun et al. ................. 705/10 |
| 7,165,041 | B1 | * | 1/2007 | Guheen et al. ................ 705/26 |
| 7,275,046 | B1 | * | 9/2007 | Tritt et al. ................. 705/36 R |

FOREIGN PATENT DOCUMENTS

WO        WO 97/17683        5/1997

OTHER PUBLICATIONS

"Just in Time for Your Summer Vacation", Jun. 2, 1999, PR Newswire.*
"Sindh Cabinet Okays Agro-Forestry Policy 1998", Aug. 23, 1998, Business Recorder.*
Martin, Tom, "Get the Lease with the Most", Jun. 3, 1991, Computerworld, vol. 25, No. 22, pp. 107-109.*
PHH Vehicle Management Services (Nov. 24, 1999) http://www.phh.com/vmshome.htm.
Good Used Stuff Merchandise for Sale (Jan. 10, 2000) http://www.goodusedstuff.com/.
MHEDA Journal Online: Fall '98: Western Carolina Forklift Keeps Watch (Nov. 24, 1999) http://www.datakey.org/mhedajournal/4Q98_articles/Member Profile.html.
MHEDA Journal Online: Winter 99: form and maintain strategic partnerships at ProMat 99: SXI Technologies (Nov. 24, 1999) http://www.datakey.org/mhedajournal/1Q99_articles/promat.html.
MHEDA Journal Online: Spring 99: Manufactures' Fair Guide: Remote Equipment Systems, Inc. (Nov. 24, 1999) http://www.datakey.org/mhedajournal/2Q99_articles/fair.html.
Tracsat & CIMA: Equipment Tracking and Monitoring Solutions (Nov. 24, 1999) http://www.cimanet.com/public/ts-overview.shtml.
Mitsubishi Forklift Trucks-Fleet-Material Handling Equipment, Industrial Trucks Lif . . . (Nov. 24, 1999) http://www.mit-lift.com/standard/fleetl.html.
Hyster: Services: Fleet Services (Nov. 24, 1999) http://www.hysterusa.com/services/fleet.ace.
Caterpillar Lift Trucks-Fleet Management-Industrial Lift Trucks, Walkies, Orderpic . . . (Nov. 24, 1999) http://www.cat-lift.com/fleet.html.
DirectAg.com—Company Info->Who We Are (Nov. 24, 1999) http://www.directag.com/directag/companyinfo/content/1,1005,2-91,00.html.
Transdat Global Heavy Equipment For Sale Database (Nov. 24, 1999) http://www.transdat.com.au/list.asp.
OpenSite Technologies, Inc.; The auction starts here (Nov. 24, 1999) http://www.opensite.com/.
1 GMIS Construction Earthmoving Machinery Mining Equipment Parts-Consulting (Nov. 24, 1999) http://www.gmis.com/consult.html.
Harris & Associates (Nov. 24, 1999) http://www.harris-assoc.com/.
iMark.com-How Our Site Works (Feb. 6, 2000) http://www.imark.com/about_works.asp.
Rental Services (CAT Rental) (Jan. 30, 2000) http://www.caterpillar.com/services/rental/rental.html.
Integrated Vehicle Systems, Inc. (Nov. 24, 1999) http://www.fleetfix.com/home.htm.
Salex Home Page (Nov. 24, 1999) http://www.salex.com/home.htm.
rd_sales (Replacement Forecast) (Nov. 24, 1999) http://www.salex.com/response/sales.htm.
Archives-Consolidate Services-warehousing and distribution services (Nov. 24, 1999) http://www.consolidatedservices.com/html/archives.html.
Welcome To Forklift Exchange We Buy and Sell Used Forklifts (Nov. 24, 1999) http://www.forkliftexchange.com/main.htm.
GE Capital Fleet Services-Fleet Management Solutions (Nov. 24, 1999) http://gecapital.com/fleet/small_fleet/sfs_fms.htm.
MHEDA Journal Online: Fall 1999: Sales Success Stories (Nov. 24, 1999) http://www.datakey.org/mhedajournal/4Q99_Articles/Success.html.
MHEDA Journal Online: Spring 99: Ask Your Board (Nov. 24, 1999) http://www.datakey.org/mhedajournal/2Q99_articles/askBoard.html.
Industrial Truck Association (Nov. 24, 1999) http://www.indtrk.org/home.htm.
Welcome to bLiquid.com! (Nov. 24, 1999) http://bliquid.com/osauction.stm.
Yale Fleet Management (Nov. 24, 1999) http://www.yale.com/services/fltmgmt.html.
Material Handling Industry of America Frames (Nov. 24, 1999) http://www.mhia.org/.
About T.I.E. (Nov. 24, 1999) http://www.toyotaforklifft.com/company_profile/company.html.
SourceLine Dealers Forum (Nov. 24, 1999) http://search.slwebsite.com/dealersforum/df.asp?Page=buylist.
Daewoo-Finance & Services Division (Nov. 24, 1999) http://www.daewoo.com/finance.html.
Raymond Leasing (Nov. 24, 1999) http://www.raymondcorp.com/pages/leasing.html.
Royal Tractor Home Page-Think Royal for all your material handling needs! (Nov. 24, 1999) http://www.royaltractor.com/.
Komatsu Global Navigator (Nov. 24, 1999) http://www.komatsu.com/.
Welcome to U-RECA HomePage (Nov. 24, 1999) http://210.253.190.250/index.html.
Kalmar AC-Chicago UsedTrucks (Nov. 24, 1999) http://www.kalmarac.com/kal-chi_usedtrucks.html.
Clark-Finance Options (Nov. 24, 1999) http://www.clarkmhc.com/Dealer Finance.html.
RER Magazine (Nov. 24, 1999) http://www.rermag.com/page.html.
Material Handling Wholesale (Nov. 24, 1999) http://www.mhwc.com/sales.html.
Credit & Financing (Nov. 24, 1999) http://www.smhco.com/credit.htm.
Intrupa Manfacturing Company-Lift Parts and Accessories (Nov. 24, 1999) http://www.intrupa.com/home1.html.
IndustryGroup-Industrial Products and Services Web-Center (Nov. 24, 1999) http://www.industrygroup.com/ (2 pages).
IndustryGroup-Industrial Products and Services Web-Center (Nov. 24, 1999) http://www.industrygroup.com/ (1 page).
Welcome to Ritchie Bros. Home Page (Nov. 24, 1999) http://www.rbauction.com/.
I.D. Systems Press (Nov. 24, 1999) http://www.id-systems.com/megapp.html.
ePlus (Nov. 24, 1999) http://www.eplusonline.com/srvc_suite.htm.
I.D. Systems, Inc.; Brochure including articles dated Oct. 1998, and May 31, 1998.
SXI Technologies; UDL fleet Management System (Undated).
Remote Equipment Systems, Inc.: UDL Fleet Management System (Undated).
International Search Report dated Mar. 1, 2005 (2 pages).

* cited by examiner 154   152

Asset

| | | | |
|---|---|---|---|
| Serial Number | 5551212 | List Price | $X.XX |
| Make | Toyota | Acquired Form | ABC |
| Model | 42-5FG20 | P.M.Hours | 150 |
| Year | 1995 | Shifts Used | 1 |
| Capacity | 5000 lb | Date Warrantied | 1/1/00 |
| Asset Type | Standard Forklift | Warranty Months | 6 |
| Application Rating | Light | Warranty Hours | 1000 |
| Description | | Date Warranty Removed | |
| Fuel Type | Diesel | Burden Labor Rate | $X.XX |
| Tire Type | Cushion | Original Equipment Cost | $XX,XXX.XX |
| Condition | good | Orginal Hour Meter | 0 |
| Power | | Original Cost Per Hour | 0 |
| Mast Type | MAST TYPE | Original Usage | 0 |
| Mast Height | 188 | Original Utilization | 0 |
| Tilt | | DSI Asset ID | 999 |
| Attachments | | DSI Lease Number | 123 |
| Other Features | | | |
| Date In Service | 1/1/01 | Click Here To View Image | |
| Comment | this has a cab | | |

156

167

Maintenance

| Select | Item Description | Date | Vendor | Cost | Comment |
|---|---|---|---|---|---|
| ● | Preventive Maintenance | 01/10/00 | Hyster Sales Company | $40.00 | |
| ○ | Steering Mechanism | 01/05/00 | Ryan's Grease Pit | $200.00 | |

164

[Edit] [Delete]      Add Maintenance Item 160   162   166   158

Fig. 6

| | | | | | | | |
|---|---|---|---|---|---|---|---|
| Fill In The Desired Search Criteria | | | | | | | |
| DSIAssetID: | | | | Year: | | | |
| DSILeaseID: | | | | Serial Number: | | | |
| Make/Model: | ----- | | | Application Rating: | | | |
| Capacity: | | | | Condition: | | | |
| Fuel Type: | ----- | | | PM Hours: | | | |
| Tire Type: | ----- | | | Mast Height: | | | |
| Warranty Months: | | | | Orig. Equip. Cost: | | | |
| Warranty Hours: | | | | Orig. Hour Meter: | | | |
| Asset Type: | ----- | | | Power: | | | |
| Location: | ----- | | | Mast Type: | ----- | | |
| Tilt: | | | | Attachments: | | | |
| Aquired From: | | | | Other Features: | | | |
| [Cancel] | | | | [Search] | | | |

| Select | Make and Model | Serial # | Year | Type | Fuel | Capacity | App. | Condition |
|---|---|---|---|---|---|---|---|---|
| ● | Hyster S120XL2S | 555888 | 1999 | Standard Forklift | Electric | 12000 | Medium | |
| ○ | Toyota 42-4FGC20 | 5551213 | 1996 | Standard Forklift | LPG | 5000 | Light | |
| ○ | Toyota 42-5FG20 | 5551212 | 1995 | Standard Forklift | Diesel | 5000 | Light | good |

[Back] [Add To Virtual Fleet] [-----▼] [Add To Market] [Next]

Market Search Criteria — 216
- Lease: ● — 218
- Buy: ○ — 220
- Rent: ○ — 222
- All: ○ — 224
- List Price Between $ [226] and $ [228]
- Asset Type: [ ]
- Make/Model: [ ]
- Condition: [ ]
- Year: [ ]
- Available By: [ ]
- [Cancel] [Search] — 230

| Select | Date Available | Description | Make and Model | Capacity | Year | Rating | Status |
|--------|----------------|-------------|----------------|----------|------|--------|--------|
| 238 ● | 1/1/00 | asdfdf | Allegany Mega-8 | 34 | 2000 | Heavy | SOLD — 234 |
| ○ | 1/10/99 | sasfdf | Multiton Swift Stacker | 12 | 2000 | Light | |

[Back]  240 — [New Search]  [Bid on Asset] — 236   [Next] — 235
[Add To Fantasy Fleet] — 242
[▼] ← 244

- 246 → Buy: ● Purchase Amount - [ ] — 252
- 248 → Lease: ○ Lease Term - [2 Year (24 mos.) ▼] 254 Amount: [ ] 258 Lease Type: [Category 1 ▼] 256
- 250 → Rent: ○ Monthly Payment - [ ] /Month
  260    262    264
  [Cancel]  [Lease Calc.]  [Submit BID]

Fig. 13

Fantasy Assets

Select Serial # Make Model  Cap  Type  App  Usage Util Cost/Hour
◉ 555888  Hyster S120XL2S  12000 lbs  Standard Medium  X.XX  X.XX%  %0.00
                                       Forklift

[Add Asset]

[Edit] [Delete]                        [Add Fleet Charge]

Fig. 14

| Unit ID | Location | Type Equip. | Make | Model | Year Mfg. | In Service | Last Meter Reading | Avg Monthly Usage Hours | Total Maint. Cost | Hrly. Maint. Cost | Total Lease Cost | Total Oper. Cost | Total Hrly. Cost | % Util. |
|---|---|---|---|---|---|---|---|---|---|---|---|---|---|---|
| 1584 | Charlotte, NC | FL | Clark | RC500-70B | 1970 | 1/1/96 | 19100 | 17 | 5,063.68 | 5.96 | 6,300.00 | 11,363.68 | 13.38 | 5% |
| 1546 | Charlotte, NC | FL | Clark | 0500-45 | 1962 | 1/1/96 | 14780 | 21 | 5,864.46 | 5.69 | 7,650.00 | 13,514.48 | 13.12 | 6% |
| 4545 | Charlotte, NC | FL | Caterpillar | T50D | 1992 | 1/1/96 | 8484 | 19 | 3,208.32 | 3.42 | 9,450.00 | 12,653.32 | 13.48 | 5% |
| 2556 | Charlotte, NC | FL | Hyster | S80XL2BC | 1996 | 6/1/96 | 1925 | 43 | 691.74 | 0.36 | 18,360.00 | 19,051.74 | 9.90 | 12% |
| 6652 | Charlotte, NC | FL | Hyster | S120XL2 | 1996 | 6/1/96 | 2248 | 50 | 1,134.90 | 0.50 | 24,480.00 | 25,614.90 | 11.39 | 14% |
| 7785 | Charlotte, NC | FL | Hyster | S156XL2 | 1996 | 6/1/96 | 2532 | 56 | 1,378.75 | 0.54 | 34,425.00 | 35,803.75 | 14.14 | 16% |
| 3218 | Charlotte, NC | RT | Crown | 35RRTT | 1992 | 1/1/96 | 6544 | 27 | 2,169.94 | 1.61 | 13,750.00 | 15,949.94 | 11.85 | 8% |
| 1199 | Charlotte, NC | BT | Crown | 36RRTT | 1992 | 1/1/96 | 9554 | 35 | 4,825.78 | 2.75 | 13,750.00 | 18,575.78 | 10.59 | 10% |
| 9587 | Charlotte, NC | RT | Crown | RR3520 | 1997 | 1/15/97 | 588 | 15 | 183.76 | .31 | 15,725.00 | 15,908.76 | 27.06 | 4% |
| 9963 | Charlotte, NC | RT | Crown | RR3620 | 1997 | 1/15/97 | 498 | 13 | 190.73 | 0.38 | 15,725.00 | 15,915.73 | 31.96 | 4% |
| Totals For Location: Charlotte, NC | | | | | | | | | 24,712.08 | 2.15 | 159,615.00 | 184,327.06 | 15.69 | 8% |

SYSTEM AND METHOD FOR DISPOSING OF ASSETS

RELATED APPLICATIONS

This application claims the benefit of U.S. Provisional Application(s) No. 60/166,042 filed on Nov. 17, 1999.

This application is a continuation-in-part of application Ser. No. 09/441,289 filed on Nov. 16, 1999 now U.S. Pat. No. 7,062,446.

This application claims the benefit of U.S. application Ser. No. 09/441,289 filed Nov. 16, 1999, and U.S. Provisional Application Ser. No. 60/166,042 filed Nov. 17, 1999, both hereby incorporated by reference.

BACKGROUND OF THE INVENTION

1. Technical Field

The present invention relates generally to an electronic system and method for use in the field of asset management and electronic commerce.

2. Description of the Related Art

The field of industrial equipment, such as forklifts, includes business entities at several different levels, including manufacturers, dealers, third-party financiers, and end-user customers. In one common arrangement, the dealer maintains an inventory of a wide variety of equipment types for rental to its end-user customers (i.e., the dealer's "rental fleet"). Some types of equipment in the dealer's rental fleet, however, are only infrequently needed by the dealer's end-user customers. Accordingly, such seldomly used items experience a reduced utilization rate compared to other items in the rental fleet. The dealer tolerates reduced utilization on the seldomly used items for a number of reasons, including maintaining customer satisfaction, and, hopefully, not giving the customer a reason to "shop around" for a new dealer who may have larger inventory of seldomly used pieces of equipment. Conventional methods of conducting business, particularly providing rental fleets, have obvious shortcomings, inasmuch as the full economic value of some items in the dealer's rental fleet cannot be realized.

Another common business arrangement involves a third-party financing company that buys pieces of industrial equipment from the manufacturer and then leases the equipment to the end-user customer. The customer then utilizes the industrial equipment (the customer's "fleet") in its business. In some circumstance, the customer actively "manages" the fleet of industrial equipment, attending to repair and maintenance, the acquisition of replacement equipment, and the retirement of old or unproductive equipment from the fleet. In other circumstances, however, the leasing company performs the asset management function. In either set of circumstances, challenges to be overcome by fleet managers include how to effectively and efficiently determine the timing, selection, and acquisition of replacement equipment, and the disposal of equipment being retired from the fleet or coming to an end of the lease term.

Known approaches to deal with the foregoing challenges fall mostly into the use of manual methods. For example, determining whether to replace a poorly performing piece of equipment has typically been based on limited data relating to the equipment known by an experienced fleet manager.

Another approach known for asset management pertains to passenger vehicle fleets and involves a computer-based, Internet-enabled vehicle selector program. The vehicle selector program provides average values for a plurality of different operating parameters and vehicle types that may be of interest to a fleet manager considering vehicle replacement. These parameters may include average monthly maintenance cost, and average miles per gallon. While the vehicle selector program provides at least some useful financial and performance information to the fleet manager, such a system fails to address the ultimate question fleet managers encounter: How does a change (i.e., an addition, or a subtraction) in the configuration of my fleet effect its overall performance? The known vehicle selector program simply does not provide information as to how a combined fleet would perform.

Another challenge, particularly acute for third-party financing companies, involves how to effectively and efficiently dispose of assets whose lease has ended, or will end in the near future. Conventional analysis approaches have been haphazard at best. They have included utilization of well-known auction systems, posting of off-lease equipment on electronic bulletin boards and the like for sale purposes, as well as utilization of consignment networks. One key shortcoming of all these known systems of disposing of end-of-lease assets manifests itself in the failure to fully realize the full, remaining economic value of the asset. One factor contributing to this shortcoming involves the lack of information available to potential purchasers, renters and lessees. Information concerning the condition, treatment, and, particularly, the maintenance history of the asset during its operating life up to the time the asset is being offered for disposal are all important in determining a sales price, but are frequently unavailable. In any event, such information is never convenient to obtain. For example, it is known in the passenger vehicle fleet industry to make some level of maintenance history data on particular vehicle available to the potential purchaser. However, to obtain this data, the potential purchaser must make a telephonic request to the asset's fleet manager, who manually looks up the information, and provides it (e.g., by way of facsimile) to the potential purchaser if it is even available. Obtaining such information, therefore, involves a significant investment, both in time and effort. The investment is entirely lost if the purchase is not consummated, and is still partially lost even if the asset is finally transferred. The time lag involved in obtaining the information also leads to undesirable inefficiency. For example, a purchaser may have to make a quick decision regarding whether or not to buy a first asset, which would preclude a lengthy investigation of a second asset (e.g., the first asset may be sold by the time the investigation of the second asset has been completed). This is particularly inefficient if the second asset is a better "fit" for the purchaser than the first asset.

There is therefore a need for a system and method for facilitating transactions, and for managing assets of a fleet, that minimizes or eliminates one or more of the types problems exemplified above.

SUMMARY OF THE INVENTION

In one aspect of the present invention, an electronic system is provided for facilitating transactions, particularly rental transactions. The electronic system provides, in-effect, a "virtual" rental fleet available to a user of the system, such as a dealer. The system includes an asset configuration unit, a market database, a market search module, and a communications interface.

The configuration unit is responsive to input data provided by a first user of the system for generating a profile of an asset. The asset profile comprises asset specification data and a bid definition. In a preferred embodiment the bid definition outlines parameters associated with a rental transaction of the asset. The market database is configured to store a plurality of asset profiles. The market search module is configured to search the market database, based on search parameters specified by a second user, and generate an identification of assets. The bid module is configured to allow the second user to select one of the assets on which to bid. The bid module is also adapted to provide rental options to the second user, based on the bid definition for the asset. Finally, the communications interface is configured for facilitating the electronic remote access by the second user of the system.

Through the foregoing, a dealer or the like is provided access to a "virtual" rental fleet of assets, some of which are not owned or controlled by the dealer. The system allows a user, such as a dealer, to satisfy the requirements of the dealer's end-user customer without having to maintain infrequently used items in the dealer's own rental fleet (which experience low utilization rates and thus return on investment.) Additionally, the electronic system also allows a user, such as a dealer, who has its own under-utilized assets to consign such assets for rental by third parties, thereby allowing an increased, effective utilization rate.

In another aspect of the present invention, an electronic system is provided for facilitating transactions, including, for example, assets disposal. The system, according to this aspect of the present invention, provides detailed information concerning an asset including the maintenance history data so that the user, a potential purchaser, rentee or lessee, may evaluate the asset. The system includes a first database, a market search module, and a communications interface.

In a preferred embodiment, the first database is configured to store information associated with a plurality of assets, such as pieces of industrial equipment. The market search module is configured to search the first database, based on search parameters specified by the user in anticipation of at least one of a purchase, rental and lease transaction. The market search module is also adapted to generate an identification of assets in accordance with the specified search parameters. At least one of the identified assets has a description that includes maintenance history data of the asset. The communications interface is configured to facilitate electronic remote access of the system by the user which, in one embodiment, occurs over the Internet.

The electronic system, according to this aspect of the present invention, maximizes value extraction by making detailed information concerning the asset readily available to the user. In particular, the maintenance history of the asset constitutes information that may increase the price obtained for the asset. For example, the maintenance history data is particularly important to a dealer class of users of the system who anticipate sub-renting or sub-leasing the asset for a short term, inasmuch as a common commercial practice places the responsibility of maintenance on the dealer, not the end-user customer. Availability of information such as maintenance history data electronically, and immediately, substantially minimizes or eliminates the cost associated with information acquisition.

In another aspect of the present invention, an electronic system for modeling a simulated fleet is provided. The capability to model a simulated or "fantasy" fleet of assets provides the user with an effective and efficient mechanism to perform "what if" analyses. The user can then use the results to evaluate what effect proposed changes to an existing fleet would have on overall fleet performance. The electronic system for modeling a simulated fleet includes a simulated fleet configuration unit, a reporting and analysis module, and a communications interface.

The simulated fleet configuration unit is provided for allowing a user to add a plurality of assets to the simulated fleet. Each asset is defined as having at least one parameter associated therewith. For example, in one embodiment, the parameter may be a total hourly cost to operate the asset. The reporting and analysis module is configured to generate a-report having a composite output value that corresponds to the parameter, and, is characteristic of all of the assets in the simulated fleet. For example, the composite output value may be a composite total hourly cost for all the assets in the simulated fleet. Finally, the communications interface is configured to facilitate electronic remote access of the system by the user. For example, in a preferred embodiment, the communications interface allows access to the system over the Internet. This reduces the time and effort to obtain information. The system, according to this aspect of the present invention, provides a more effective asset management tool than available using conventional systems.

In a preferred embodiment, some of the assets contained in the simulated fleet correspond to assets already contained in the user's existing fleet. The remainder of the assets in the simulated fleet correspond to new or used assets proposed for acquisition by the user. The report generated by the reporting and analysis module contains a composite output value representative of all the assets in a simulated fleet, namely, both the existing assets, and the proposed assets to be acquired. The report may be compared to a second report generated based on the performance of the assets in the existing fleet alone. Comparison of the two reports by the user allows accurate evaluation of the impact of the proposed changes.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

FIG. 6 is a simplified diagrammatic view of a screen output of the system of FIG. 1, illustrating greater detail of a selected asset, including maintenance history data;

FIG. 9 is a simplified diagrammatic view of a screen output of a fleet search module of the present invention;

FIG. 10 is a simplified diagrammatic view of a market search criteria input form;

FIG. 11 is a simplified diagrammatic view of a screen output showing an identification of assets resulting from the market search;

FIG. 12 is a simplified diagrammatic view of a screen output showing purchase, lease and rental options;

FIG. 13 is a simplified diagrammatic view of a screen output showing assets contained in a simulated or "fantasy" fleet; and FIG. 14 is a simplified diagrammatic view of a screen output illustrating a report, including a composite financial parameter, for a simulated fleet.

DETAILED DESCRIPTION OF THE PREFERRED EMBODIMENTS

Figure 1:
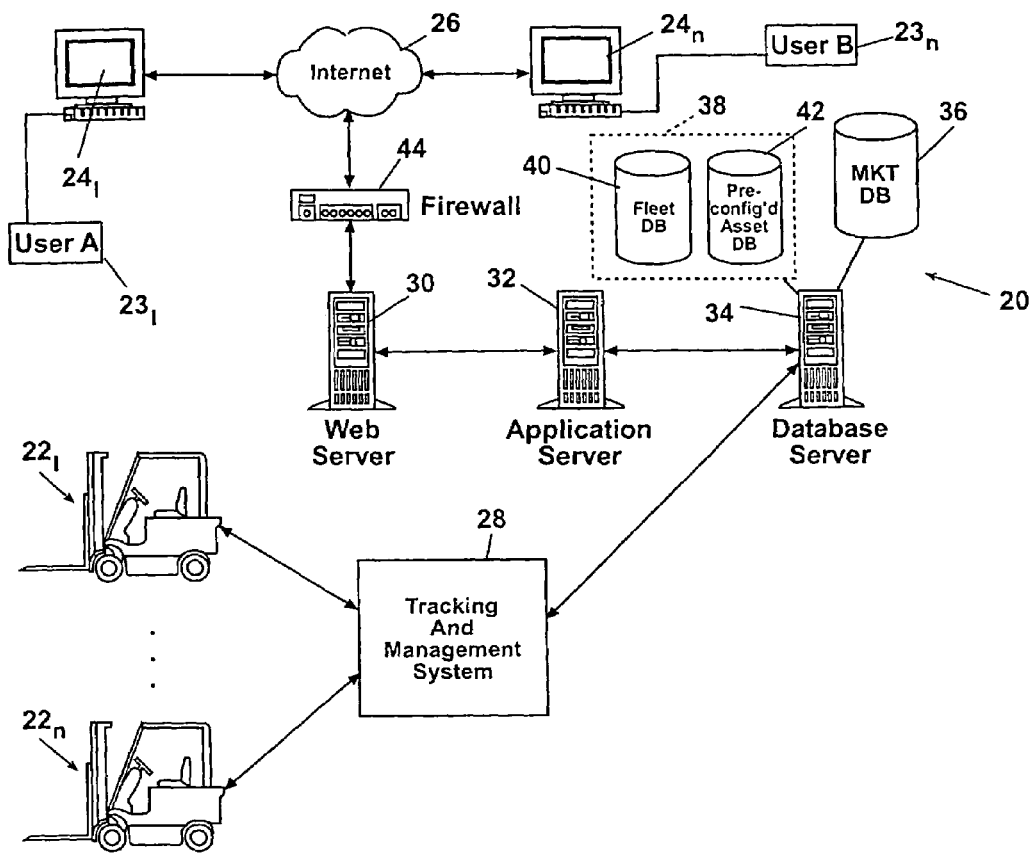
FIG. 1 is a simplified diagrammatic and block diagram view of a fleet management and electronic-commerce system in accordance with the present invention.

Referring now to the drawings wherein like reference numerals are used to identify identical components in the various views, FIG. 1 is a simplified diagrammatic and block diagram view showing an electronic system 20 for managing, tracking and conducting electronic commerce, with respect to a plurality of assets designated $22_1, \ldots, 22_n$. The assets $22_1, \ldots, 22_n$ are illustrated as being a plurality of pieces of movable industrial equipment, such as a plurality of conventional forklifts or similar machinery, used in the manufacture of goods in a typical factory environment. It should be understood, however, that system 20 is configured for operation with a wide variety of assets. System 20 is further configured to manage, and facilitate commercial transactions involving other assets (i.e., those not tracked) that are consigned or otherwise made available on an electronic market established by system 20.

Before proceeding to a detailed description of system 20 keyed to the drawings, a general overview of the features of the present invention will be set forth.

Electronic system 20 overcomes a problem identified in the Background, namely, the inability of prior systems to significantly facilitate business transactions that could increase utilization of infrequently rented assets in a user's rental fleet. Electronic system 20 includes functionality that allows users, in-effect, to consign assets on an electronic market in a manner that makes detailed information, such as maintenance history, readily available. Through the foregoing, users of system 20 having under-utilized equipment may use system 20 to "post" such equipment on the electronic market for rental, lease, or the like by other users of the system. Not only does system 20 enable some users to increase utilization of under-utilized assets, other users, (e.g., dealers) who have an occasional need for some equipment (e.g., to provide to their end-user customers), can rent or lease equipment from the market in contemplation of sub-rental or sub-lease, without having to actually own the equipment. Detailed information, such as maintenance history data, allow users to make informed decisions. Equipment selection efficiency is significantly improved since it is commonplace for users such as dealers to be responsible for the maintenance of equipment they sub-rent. Well maintained and problem free equipment will likely be in the highest demand, and draw the highest lease and rental rates.

Another shortcoming set forth in the Background involves the failure to realize an assets' full value upon disposal at the end of a lease term. Conventional systems are inefficient and inconvenient for making desired information available to new owners, leasees, and renters prior to their making decisions concerning such transactions. In accordance with the present invention, electronic system 20 is configured for facilitating transactions by creating an electronic market. In particular, system 20 is configured to allow remotely located users to electronically search the market based on search parameters they specify, and obtain a detailed description of the assets, including the maintenance history data. System 20 also includes a bidding mechanism configured to allow the user to bid on the assets. The contemplated transactions can be closed electronically.

As stated in the Background, one shortcoming of conventional asset management systems involves the absence of an electronic "what if" analysis tool. The present invention overcomes this shortcoming, enabling the creation of a simulated ("fantasy") fleet. A user of system 20 may add a plurality of assets to the simulated fleet, including currently held or controlled assets in an existing fleet, such as assets $22_1, \ldots, 22_n$, as well as new and/or used assets available in a "market" portion of system 20. The simulated fleet analysis tool allows the user to evaluate proposed changes to an existing fleet. The tool may be used to compute parameters of interest that are characteristic of all the assets contained in the simulated fleet, which can then be compared to the same parameters for the user's existing fleet.

Referring now to FIG. 1, system 20 is configured for electronic remote access by a plurality of remote users, designated $23_1, \ldots, 23_n$, through remote client computers $24_1, \ldots, 24_n$, over a global computer network, such as Internet 26. Private networks or dial-up connecting may also be used. Inasmuch as system 20 performs a variety of functions, such as tracking and management of assets, as well as facilitating electronic commerce, the users $23_1, \ldots, 23_n$ may fall into a plurality of user classes, which are accommodated within system 20.

With continued reference to FIG. 1, remote client computers $24_1, \ldots, 24_n$ may be any one of a plurality of well known computer systems, such as, for example, a personal computer (PC) running a Microsoft Windows operating system (e.g., Windows 95, Windows 98, Windows NT Workstation, and Windows 2000), or a Macintosh computer (Apple Computer). When used with Internet 26, remote client computers $24_1, \ldots, 24_n$ are preferably configured to include a conventionally, commercially available web browser, such as, for example, Netscape Navigator 4.0 or higher, commercially available from Netscape Communications Corporation, or Microsoft Internet Explorer 4.0 or higher, commercially available from Microsoft Corporation, Redmond, Wash. The browser included on client computers $24_1, \ldots, 24_n$ preferably includes the capability of establishing a secure connection through Internet 26, by way of a firewall system 44 with web server 30, for example, using a Secure Sockets Layer (SSL) protocol described below. Of course, other mechanisms for establishing a secure connection, such as the S-HTTP protocol may be used so long as both the client computers 24 and web server 30 are configured to include software compliant with the chosen protocol. Moreover, the present invention recognizes that different client software may be required when using private networks or a dial-up connection.

System 20 interfaces with a tracking and management system 28, and preferably includes a first computer system, such as a web server 30, a second computer system, such as an application server 32, and a third computer system, such as a database server 34. One or more of the servers may be combined, depending on the size and complexity of system 20. Database server 34 is coupled to a market database 36 and a global asset database 38 comprising a fleet database 40 and a preconfigured asset database 42. In the client-server architecture described herein, the "server" provides the information to the "clients". Electronic system 20 may further include, in an alternative embodiment, a firewall system 44.

Tracking and management system 28 is configured to automatically gather, analyze, and deliver information relating to the procurement and utilization of assets $22_1, \ldots, 22_n$, so as to maximize productivity and to reduce operating cost and administrative burdens. Each asset may be provided with a data acquisition device for sensing and storing one or more operating characteristics associated with the asset. Such information can be transmitted to a receiver connected to a collection controller contained within system 28 for purposes of storing such information. System 28 may be further configured to automatically update individual records associated with each of the assets with information received, including for example, maintenance history information, and hour-meter readings. System 28 is operatively coupled to electronic system 20, particularly database server 34, as shown in FIG. 1. This coupling allows system 20 to be updated with current information regarding the tracked assets $22_1, \ldots, 22_n$. Users $23_1, \ldots, 23_n$ may then access and review the status of their fleets, over Internet 26, using system 20 as a gateway. Tracking and management system 28 may be a system as described in co-pending application U.S. Ser. No. 09/441,289, filed Nov. 16, 1999 entitled "APPARATUS AND METHOD FOR TRACKING AND MANAGING PHYSICAL ASSETS", hereby incorporated by reference in its entirety.

Web server 30 operates as a communications interface for facilitating electronic remote access of system 20 by users $23_1, \ldots, 23_n$ via client computers $24_1, \ldots, 24_n$ when using Internet 26. Web server 30 is preferably compatible with the ubiquitous HyperText Transfer Protocol (HTTP 1.1), and includes the capability of establishing a secure connection with client computers $24_1, \ldots, 24_n$ via, for example, the publicly available Secure Sockets Layer (SSL) protocol. Version 3.0 of the SSL protocol is commercially available from Netscape Communications Corporation. Web server 30 may comprise suitable hardware configured to handle anticipated traffic (e.g., requests, responses) therethrough, and may further execute conventional, commercial software, such as Windows NT 4.0 operating system software running Microsoft Internet Information Server (IIS 4.0) software, both commercially available from Microsoft, Redmond, Wash. USA.

Application server 32 is configured for running components of system 20, described functionally below, as well as serving reports. Application server 32 may comprise conventional, commercially available hardware, and include conventional, commercially available software such as Windows NT 4.0 operating system software, Microsoft Transaction Server 2.0 transaction server software, as well as a conventional, commercially available reporting engine software, such as Power Builder or Crystal Reports.

Database server 34 is configured for executing all database serving within electronic system 20, and may comprise suitably adapted hardware selected, in part, on anticipated traffic and data access response-time standards set for system 20. Database server 34 may include conventional, commercially available software, such as Windows NT 4.0 operating system software, and Microsoft SQL server 7.0 database server software, both from Microsoft, Redmond, Wash. USA.

Web server 30, application server 32, and database server 34 define a multi-tiered computing environment configured to achieve and implement the functionality to be described in greater detail hereinafter. It should be understood that alternate architectures may be employed, achieving the same functionality, yet remain within the spirit and scope of the present invention.

System 20 organizes asset information into several logical groups. Market database 36, shown diagrammatically in FIG. 1, is configured for storing a plurality of asset profiles, associated with a corresponding plurality of assets, destined for disposal on an electronic market. Contemplated transaction types include sale, rental and lease. The asset profile includes two parts: asset specification data and a bid definition. The asset specification data includes a variety of details about the asset, as well as its maintenance history. The bid definition outlines the parameters associated with the above-described commercial transactions contemplated for the asset. Market database 36 is illustrated as a logically separate database, although it should be understood that market database 36, in alternative embodiments, may be implemented together on the same physical hardware as the global asset database 38. Market database 36 is configured for rapid retrieval of asset information, as desired to facilitate the electronic commerce functionality of electronic system 20.

Fleet database 40 is configured to store asset specification data for assets contained in fleets being managed by system 20. As used herein, "fleet" is a logical grouping or association of one or more assets, which may include assets $22_1, \ldots, 22_n$ being tracked and managed by system 28. A "fleet" may be either (i) a current fleet, or (ii) a simulated or "Fantasy" fleet. An existing fleet is a fleet containing assets under the control of a user, for example, through ownership or lease. A "Fantasy" fleet may contain (i) any assets in any of the user's existing fleets ("held assets"), (ii) new or used assets not held or controlled by the user such as may be available for purchase, rental, or lease from third-parties via the market, or (iii) fictional assets having a predetermined usage, and performance profile, from the preconfigured asset database 42.

Preconfigured asset database 42 includes a plurality of asset specifications for various asset types. The asset specification includes values that may be a composite of a plurality of specific, actual assets of the same or similar type. For example, a model "A" forklift from a particular manufacturer may have an average monthly maintenance cost based on a long history of tracking the maintenance cost for model "A" forklifts. A preconfigured asset brings these composite values when added to a fleet.

Firewall system 44 is disposed between the connecting network such as Internet 26, which is generally considered "insecure", and the secure, private network on which servers 30, 32, and 34 reside and execute. Firewall system 44 may be implemented in software, hardware, or a combination of both. As is known generally, firewall system 44 is configured to intercept messages destined for web server 30, or exiting therefrom, and to examine such messages, and block those that do not meet security criteria. Firewall system 44 enhances the security, and hence the integrity, of the electronic market established by the invention. Firewall system 44 may comprise conventional devices and methodologies known to those of ordinary skill in the art.

Figure 2:
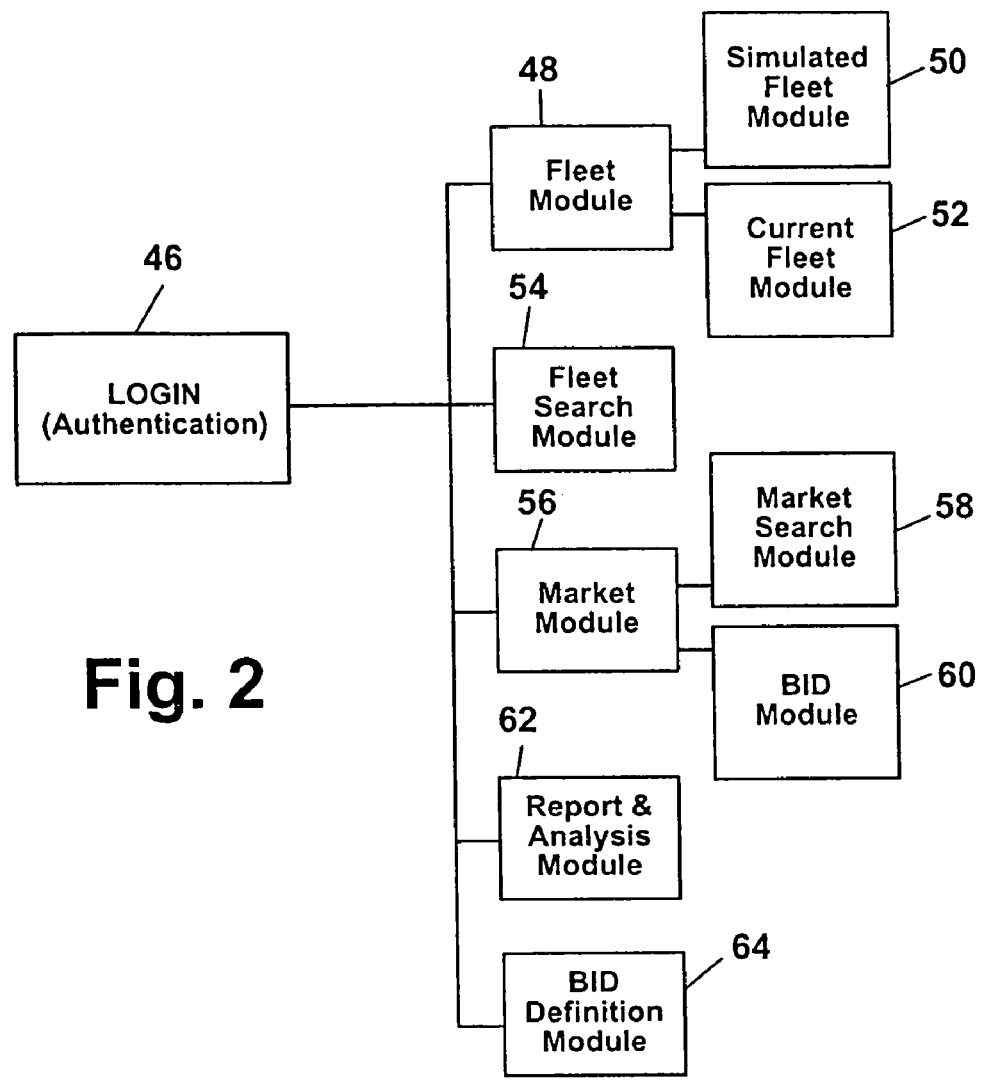
FIG. 2 is a simplified block diagram view illustrating functional modules according to the invention.

FIG. 2 is a block diagram view of the functional modules implemented on electronic system 20. Functional modules include a login or authentication module 46, a fleet module 48 comprising a simulated fleet module 50 and a current fleet module 52, a fleet search module 54, a market module 56 comprising a market search module 58 and a bid module 60, a reporting and analysis module 62, and a bid definition module 64.

Login 46 provides authentication functions, principally through a user ID/password approach. In one embodiment, electronic system 20 includes several classes of users: a guest class, a member class, and a dealer class. A guest is characterized as having no member privileges, but can view assets available in market database 36, as well as other public areas of electronic system 20. A member has an enhanced set of privileges. A member may create an actual fleet, and/or a simulated fleet, may conduct searches of the assets contained in the members existing and/or simulated fleets, may search market database 36 and bid on selected assets, run reports and conduct analyses, as well as place assets in market database 36 for disposal. A dealer has access to the features available to members, but in addition, has access to a set of dealer tools generally unavailable to members, as discussed further below. Finally, electronic system 20 provides for an administrative class of users having heightened, administrative rights and privileges, for example to perform maintenance or reconfigure system 20.

Before new users can practically use system 20, they must register. Accordingly, associated with login module 46 is a registration module (not shown) that allows a new user to register, typically as either a member, or a dealer. For registration activities and/or user profile changes, web server 30 and the corresponding client computer 24 communicate via a secure, encrypted connection, such as via the SSL encryption protocol.

Regarding existing users, login module 46 is configured to automatically log the user in upon detection of an auto-login "cookie". A "cookie" is a message that is given to a client (e.g., a web browser on a client computer $24_1$, , $24_n$) by a server (e.g., web server 30). Client computer $24_1$ will cache the cookie, and store the cookie in a file on the client computer $24_1$ if the cookie is a so-called "persistent" cookie. A part of the message is a description of the range of URLs (e.g., http://www.ironrhino.com) for which that cookie is valid, and a time period for which the cookie will persist. Any future HTTP requests by the client computer that fall within that URL range (e.g., http://www.ironrhino.com) and valid time period will include, with the HTTP request, the current value of the cookie to the server. In operation, electronic system 20 is configured to query a user 23 using a client computer 24 to determine whether the user wishes to save the user-login and password. If the user responds "YES", then electronic system 20, particularly web server 30, sends a cookie to the corresponding client computer 24, wherein the cookie is stored in a file. When the user subsequently accesses the URL from which the home page of system 20 are served, the browser portion of client computer 24 determines a match and will send the auto-login cookie, (containing login/password) to electronic system 20 for authentication purposes. Upon successful login, login module 46 directs the user (e.g., member or dealer) to the user's start page (best shown in FIG. 3).

With continued reference to FIG. 2, fleet module 48 is configured to allow members and dealers to add their current fleet information into electronic system 20 for reporting, tracking and analyzing by module 62. It should be understood that such activities provide much information regarding the status of the fleet, and upon which important business decisions can be based. Simulated fleet module 50 is configured to allow a user 23 to access, add, view, edit and delete assets in a simulated fleet. According to the invention, the "Fantasy fleet" feature allows accurate and immediate "what if" analysis, unavailable through the use of conventional systems. Current fleet module 52 allows a member or dealer to access, add, view, edit, or delete assets in one or more existing/actual fleets associated with the registered member or dealer.

Figure 3:
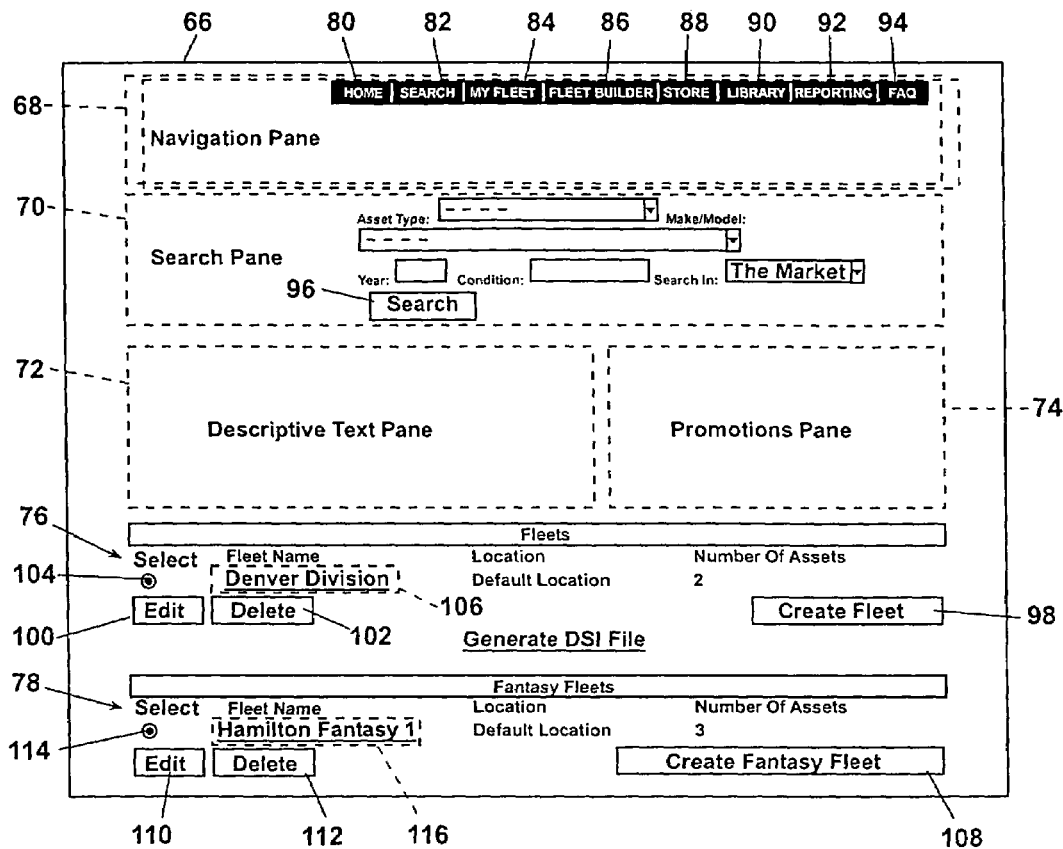
FIG. 3 is a simplified diagrammatic view of a screen output of the system of FIG. 1, including a link to further fleet information.

FIG. 3 shows a user's "start" page 66 generated by fleet module 48 after a successful login. Start page 66 includes a navigation pane, a search pane 70, a descriptive text pane 72, an advertising/promotions pane 74, an existing fleet information pane 76, and a simulated or "fantasy" fleet information pane 78.

Navigation pane 68 includes, in the illustrated embodiment, a plurality of user-invoked (e.g., via "clicking" with a mouse or other pointing device) functions or operations that enable efficient navigation through the various modules of electronic system 20. Navigation pane 68 includes a Home button 80, a Search button 82, a "My Fleet" button 84, a "Fleet Builder" button 86, a STORE button 88, a Library button 90, a Reporting button 92, and a FAQ (Frequently Asked Questions) button 94. Wherever the user-navigates to within system 20, navigation pane 68 will appear at the top of the screen.

The "Home" button directs system 20 to take the user back to an initial login/registration page, which is then displayed on the user's client computer 24. Search button 82 invokes fleet search module 54, which is configured to search the user's fleets to identify assets based on user specified search criteria (e.g., make, model, and year of manufacture.). The "MY FLEET" button 84 invokes fleet module 48, taking the user to the user's start page 66. The "FLEET BUILDER" button 86 invokes a fleet builder wizard to lead the user through the steps of creating a new fleet of actual assets, or a simulated fleet. The "STORE" button 88 invokes market module 56, providing the user with access to conduct searches of market database 36 to identify assets for purchase, rental or lease. Library button 90 invokes a library module (not shown) that allows the user to visit the on-line library of system 20 for access to downloadable documents. Reporting button 92 invokes reporting and analysis module 62 for obtaining reports containing analysis results for fleet assets or market items. FAQ button 94 invokes FAQ module (not shown), allowing the user to access questions and answers of interest to the users of system 20.

Search pane 70 includes pull down menus for defining search parameters for conducting a search of either market database 36, or fleet database 40. The search is invoked, in an illustrated embodiment, by selecting (i.e., "clicking") on a "Search" button 96.

The descriptive text pane 72 is configured to display predetermined text to the user, based on user interaction with electronic system 20. For example, descriptive text pane 72 may include information instructing the user as to the organization of start page 66, and the available options, such as creating an actual fleet or a fantasy fleet.

Advertising/promotions pane 74 is configured to display advertising or promotions that may be available. For example, certain pieces of equipment may be on a "lease special", more details of which may be found in the site "STORE" (i.e., via "clicking" on "STORE" button 88 on the user's start page).

Current fleet information pane 76 comprises the interface through which a user interacts with electronic system 20 to create an actual or a current fleet, and to edit or delete a fleet. Fleet information pane 76 includes, in the illustrated embodiment, a "Create Fleet" button 98, an Edit button 100, a Delete button 102, a radio button 104, and a link 106. Selecting (i.e., "clicking") on the "Create Fleet" button 98 causes fleet module 48 to create a new fleet record in fleet database 40. In one embodiment, the record includes a fleet name, and a location. Edit button 100, when selected by the user, invokes current fleet module 52, which is configured to allow the user to edit the fleet name and/or location of the fleet selected by radio button 104. Note that in FIG. 3, only one existing fleet (i.e., the "Denver Division") is illustrated; however, when two or more existing fleets are displayed, each have a corresponding radio button 104 associated therewith, and only one of the radio buttons may be selected at a time (i.e., is darkened). The fleet having a darkened radio button is the "selected" fleet for purposes of Edit button 100, and Delete button 102. Selecting the delete button 102 causes current fleet module 52 to delete the selected fleet from database 40. In the fleet information pane 76, in the illustrated embodiment, each existing fleet under the heading "Fleet Name" is configured to operate as a link to another page generated by system 20, particularly current fleet module 52. This "linked" page provides an identification of the assets contained in the fleet. The portion of the "linked" page that shows the asset identification is illustrated in FIG. 4 (portions of the "page" have been omitted for clarity, like the Navigation pane 68, which has was already been shown in FIG. 3).

With continued reference to FIG. 3, Fantasy Fleet information pane 78 includes a "Create Fantasy Fleet" button 108, an Edit button 110, a Delete button 112, a radio button 114, and a link 116. Pane 78, and buttons 108, 110, 112, 114, and link 116 operate in a substantially identical fashion to pane 76, buttons 98, 100, 102, 104, and link 106, as described above, except that they pertain to the Fantasy Fleets.

Figure 4:
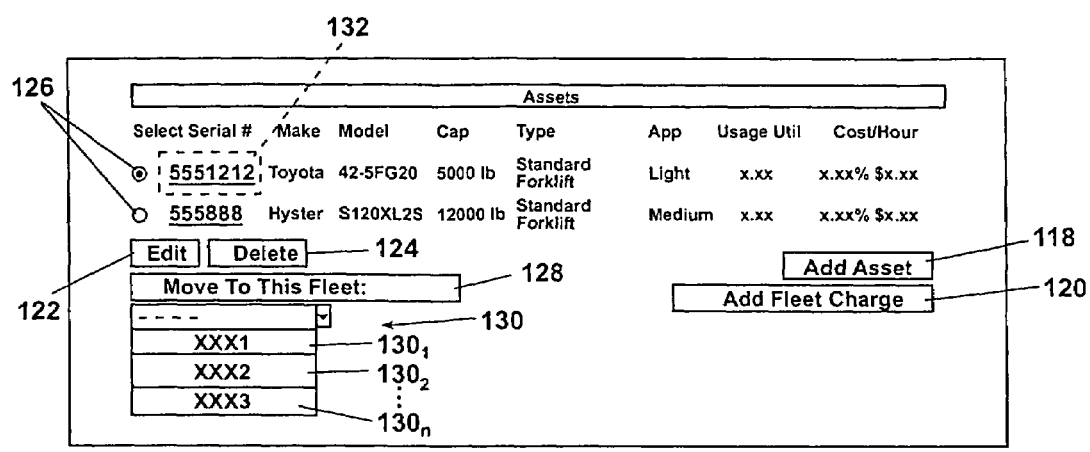
FIG. 4 is a simplified diagrammatic view of a screen output of the system of FIG. 1, showing detailed fleet information.

FIG. 4 shows a screen output current fleet module 52, responsive to a user's selection of link 106 in FIG. 3. FIG. 4 includes an identification of the individual assets included in the "Denver Division" fleet. In an illustrated embodiment, the identification includes a listing of the following parameters for each asset: a serial number, a make, a model, a capacity (pounds), an asset type, an application rating, a usage parameter, a utilization parameter (percent), and a cost/hour (U.S. Dollars).

The view illustrated in FIG. 4 includes an "Add Asset" button 118, an "Add Fleet Charge" button 120, an Edit button 122, a Delete button 124, a plurality of radio buttons 126, a Move button 128, a pull down menu 130 including entries $130_1, 130_2, \ldots, 130_n$, and a link 132. The "Add Asset" button 118, when selected by the user, causes current fleet module 52 to add assets to the selected fleet. This process will be described in greater detail below. The "Add Fleet Charge" button 120, when selected, causes a charge (i.e., monetary charge) to be applied pro-rata to each of the assets included in the selected fleet. Edit button 122, and Delete button 124, when selected by the user, respectively, cause current fleet module 52 to allow the user to edit, or delete an asset from the selected fleet. Which asset is affected is determined by which radio button 126 is selected. The edit function allows the user to edit the asset specification data associated with the asset. The "Move" button 128, when selected by the user, moves an asset (as selected by the radio button 126), from the current fleet to the fleet chosen by the user from one of the entries $130_1, 130_2, \ldots, 130_n$ in pull down menu which are actual fleets as well as to thereby move real, existing assets between existing fleets.

Figure 5:
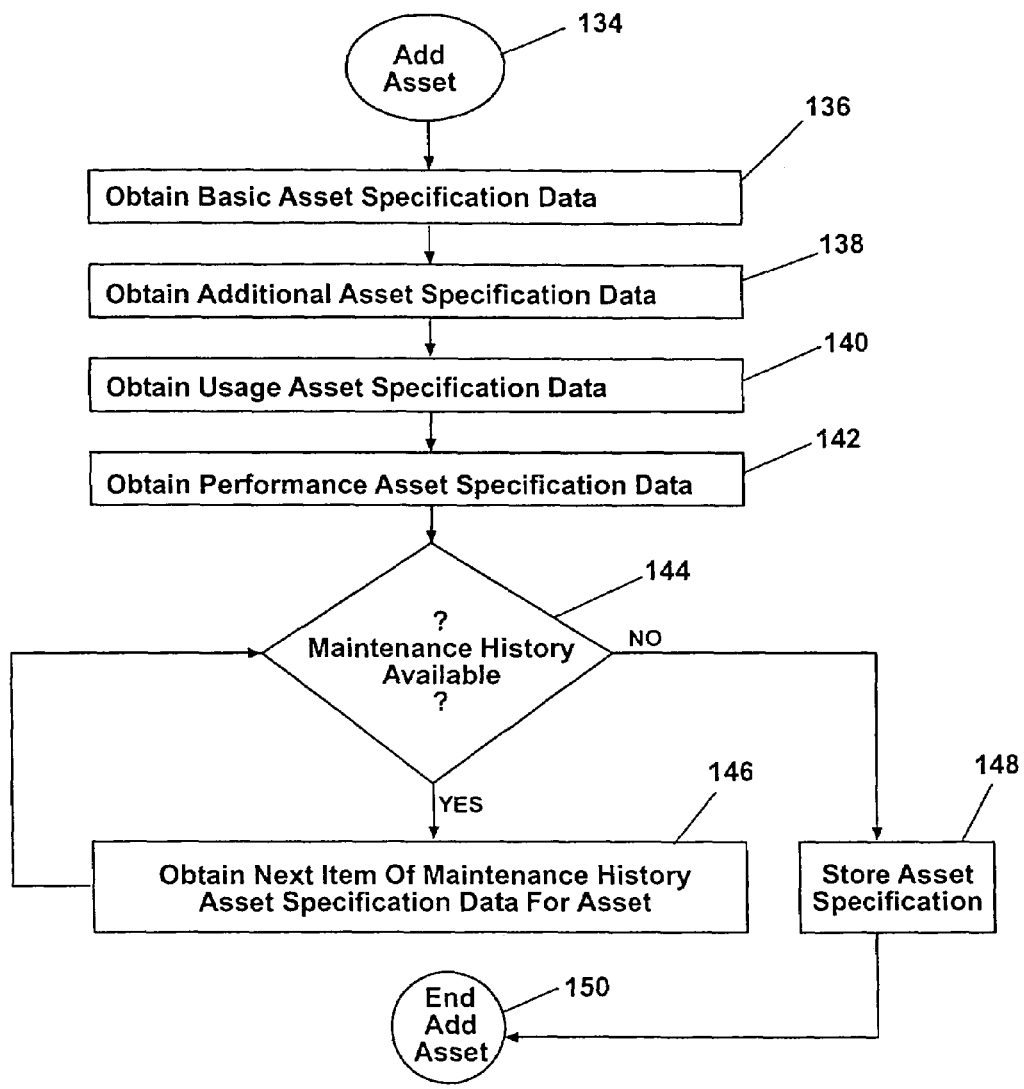
FIG. 5 is a simplified flowchart diagram showing the steps for a method of adding an asset to a fleet.

FIG. 5 is a simplified flowchart diagram illustrating the steps for a method of adding an asset to a fleet. The method begins in step 134. The "Add Asset" function may be invoked from either simulated fleet module 50 or current fleet module 52. The description of FIG. 5 will be made with reference to module 52, although it should be understood that module 50 could be executing the steps as well.

In step 136, current fleet module 52 obtains basic asset specification data responsive to input data provided by user 23. While the particular types of information contained in the asset specification data will vary depending on the particular asset type involved, in the illustrated embodiment where the asset comprises an industrial piece of equipment, namely a forklift, the asset specification data is divided into four subgroups: "basic", "additional", "usage", and "performance". In one embodiment, the "basic" asset specification data may include an asset type (e.g., a standard forklift), a make/model designation, a serial number, a year of manufacture, a capacity (e.g., in pounds), and commentary text. In a constructed embodiment, "clicking" the "Add Asset" button causes a dialog box to be presented to the user having four tabs labeled "basic", "additional", "usage" and "performance". The user moves from tab to tab, filling out respective forms, comprising input boxes and pull down menus. When complete, the user "clicks" on a "SAVE" link. The method then proceeds to step 138.

In step 138, module 52 obtains "additional" asset specification data, which in the illustrated embodiment of a forklift may include a mast type (e.g., quad, standard, STD, TSU, etc.), a tire type (e.g., cushion, foam filled, non-marking, pneumatic, polyurethane, etc.), a "fuel type", a mast height, a tilt selection, an attachment description, an asset description, a condition, and an accounting system asset identification (ID) number, and a lease ID number. As will be described below, reporting and analysis module 62 generates reports that include financial parameters, on both a per-asset and a per-fleet basis (e.g., average monthly cost). Part of the cost analysis derives from how much is paid monthly to lease or rent the asset. This cost information, in one embodiment, is derived from information found in a separate accounting/leasing system (not shown), and is identified and retrieved by electronic system 20 using the accounting system asset ID number, and lease ID number, provided as "additional" asset specification data in step 138. In an alternate embodiment, where the asset being added is not an asset covered under a lease in a leasing system in electronic communication with system 20, further financial-option information will be obtained from the user for the asset being added, which may include a purchase price (including applicable depreciation information so as to enable calculation of a monthly cost amount), a lease/rental amount, a lease-life rental-term, and a residual amount for lease/rent. The method then proceeds to step 140.

In step 140, current fleet module 52 obtains "usage" asset specification data, which may comprise the following: an acquired-from name (i.e., name), an application rating (e.g., light, medium, heavy), a date in service, an active asset designation (i.e., yes or no), a number of shifts used, an original cost per hour, an original usage, an original utilization, as well as other features. The method then proceeds to step 142.

In step 142, current fleet module 52 obtains "performance" asset specification data comprising an original hour meter reading, a number of warranty months, a number of warranty hours, a date warranted, a date warranty removed, an original equipment cost, a list price, a preventative maintenance (PM) hours specification, and a burden labor rate. It should be appreciated that the original hour meter reading provided to system 20 in step 142 has a date associated therewith. The meter reading and date form a data pair. Future service events on the asset will generally also include further meter readings, such that the fleet database will have a plurality of date/meter-reading data pairs, each having a different date attached to it, for the life of the asset.

When the user completes the entry of the asset specification data, the user will be prompted to enter maintenance history data for the asset being configured. As shown in decision block 144, current fleet module 52 determines, through a suitable prompt to the user, whether further maintenance history data is available. If the answer is "YES", then the method branches to step 146.

In step 146, current fleet module 52 obtains the next item of maintenance history data for the asset being configured. Maintenance history data may include the job date, a description of the problem (e.g., work-related, abuse, breakdown, regular maintenance) for which maintenance was required, a diagnosis, a commentary, a description of the actual work performed, the name of the vendor performing the work (if applicable), whether the maintenance source is internal/external, whether covered under warranty, a description of the part replaced, a length of service, and an hour meter reading (usage). Financial parameters for the maintenance items obtained from the user may include: Invoice Number, Invoice Date, Invoice Due Date, Invoice Paid Date, Total Cost, Labor Rate, Parts Tax, Labor Tax, Labor Hours, whether the item is Taxable, Exchange Rate, and Exchange Date. Financial parameter values for maintenance items may be used to determine total maintenance cost, and average maintenance cost for the asset. The method then loops back to decision element 144. If the answer to decision element 144 is "NO", then the method branches to step 148.

In step 148, the asset specification data, including maintenance history data, for the asset being configured is stored in fleet database 40. The method then proceeds to step 150, where the "add asset" portion of the current fleet module 52 ends.

The process for adding an asset to a "Fantasy Fleet", although not shown specifically, is the same as outlined above for adding an asset to a current fleet, except that fleet module 48 invokes simulated fleet module 50, rather than current fleet module 52.

FIG. 6 shows a screen output generated by current fleet module 52 for a configured asset. The configured asset comprises asset specification data 154 including maintenance history data 156. In the example illustrated in the drawing, the user reaches the screen of FIG. 6 by "clicking" on link 132 in FIG. 4. Through the foregoing, a user wishing basic information (i.e., a simple identification) of the assets in the user's fleet need proceed no further than FIG. 4. However, for greater detail, including a description of the asset, the user can "drill down" by clicking on link 132 to reach FIG. 6. Screen output 152 further illustrates an "Add Maintenance Item" button 158, an Edit button 160, a Delete button 162, a plurality of radio buttons 164 and links 166, and 167.

For assets being tracked and managed by way of system 28, maintenance history items, such as those illustrated as "Preventive Maintenance" and "Steering Mechanism", are automatically entered and available to electronic system 20 through an information transfer, from a tracking system 28. For assets not tracked by system 28, such data is input to system 20 through "front-end" entry by the user (e.g., selecting the "Add Maintenance Item" button 158).

The Edit button 160, and the Delete button 162, when selected by the user, cause current fleet module 52 to allow the user to either edit, or delete, respectively, the maintenance item selected via one of the radio buttons 164. The foregoing availability of asset specification data, including maintenance history data, enhances real time management of assets in a fleet (e.g., provides the ability to identify high maintenance items).

The user, by selecting or "clicking" on link 166, is provided with even greater detail for a selected maintenance item, for example, the item captioned "Preventive Maintenance". Selecting link 167 causes current fleet module 52 to retrieve an image of the selected asset. Other features may be provided in the asset description shown in FIG. 6, including links to asset specification information provided by the manufacturer, user manuals, repair manuals, and many other types of information that may be useful concerning the asset.

Virtual Rental Fleet

Figure 7:
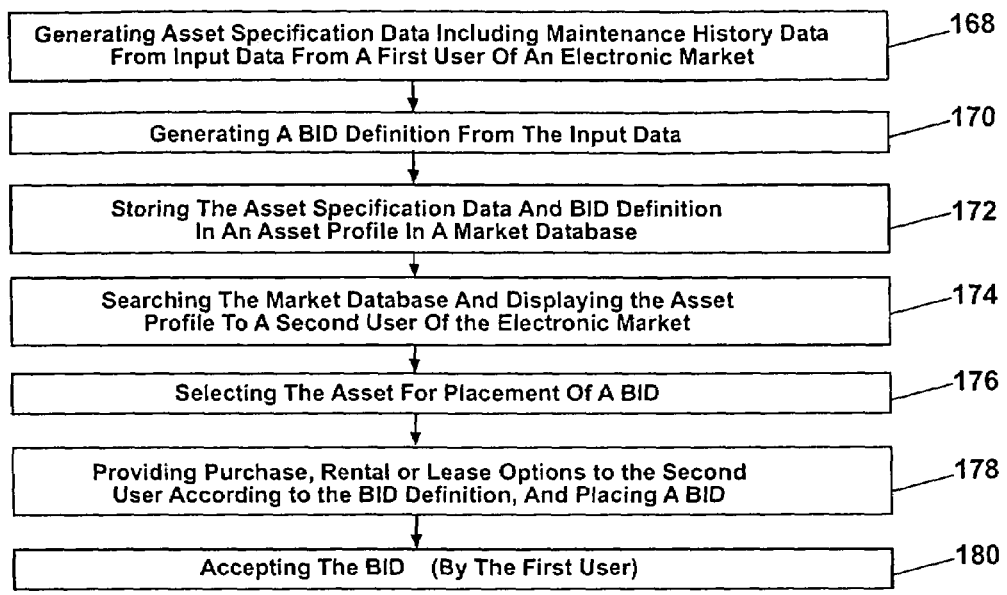
FIG. 7 is a simplified flowchart diagram illustrating the steps for a method of consigning an asset for sale, rental or lease.

Referring now to FIG. 7, in accordance with the present invention, electronic system 20 is configured to facilitate transactions where a first user, such as a dealer, can consign assets, such as forklifts, to the electronic market established by system 20 for sale, rental, or lease. This feature allows the first user, such as the dealer, to increase asset utilization by exposure of the asset to a broader audience than just the end-user customers of that dealer. Additionally, by making assets available that a second user/dealer can rent, with a view towards sub-renting to an end-user customer, electronic system 20 in-effect provides a "virtual" rental fleet. The rental fleet is "virtual" because electronic system 20 enables the second user/dealer to provide equipment to his end-user customer that he does not own.

Significantly, the availability of maintenance history data for an asset allows the second user/dealer to make a better informed decision before renting the asset. In the rent/sub-rent scenario this is particularly important since the second user/dealer is typically responsible for the ongoing maintenance and service of the asset during the sub-rental term (i.e., the end-user-customer typically does not pickup this responsibility during the sub-rental term).

Referring to FIG. 7, a method of consigning an asset for sale, rental or lease on an electronic market includes several steps. These method steps will be described briefly as an initial matter, then in greater detail in-turn.

Step 168 involves generating asset specification data including maintenance history data from input data provided by a first user.

Step 170 involves generating a bid definition from further input data from the first user.

Step 172 involves storing the asset specification data and the bid definition together in an asset profile in market database 36.

Step 174 involves searching, market database 36 based on criteria specified by a second user and displaying the asset profile.

Step 176 involves receiving a selection of an asset from the second user for placement of a bid.

Step 178 involves providing, to the second user, one or more of a purchase, rental or lease options, in accordance with the bid definition. Step 178 also includes receiving a bid on the asset from the second user, based on the transaction options.

Step 180 involves receiving an acceptance of the bid from the first user. Once the bid has been accepted by the first user (i.e., the party "posting" the asset on the electronic market), bid module 60 operates to close the transaction contemplated by the bid.

Figure 8:
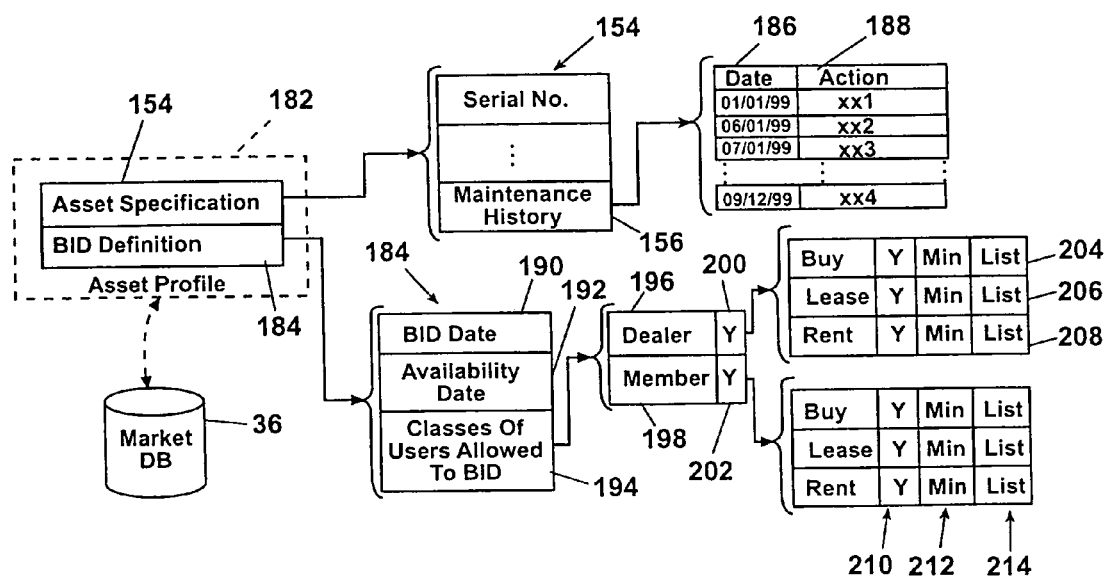
FIG. 8 is a simplified diagrammatic and block diagram view showing, in greater detail, the process for generating asset specification data and a bid definition.

FIG. 8 provides greater detail of generating step 168 (producing asset specification data) and generating step 170 (producing bid definition). In particular, FIG. 8 graphically shows in block form an asset profile 182 comprising asset specification data 154, and a bid definition 184. Referring to the upper half of FIG. 8, asset specification data 154 includes a plurality of field values, including maintenance history data 156. Maintenance history data 156, in turn, comprises at least a date parameter 186, and an action 188 may be any of the information referred to above regarding the maintenance item. In the illustrated embodiment, generating the asset specification data may be performed by executing the "add asset" method described and illustrated in connection with FIG. 5.

Bid definition 184 defines the parameters associated with the asset being consigned for sale, rental or lease to the electronic market created by system 20. The bid definition 184 defines the bounds of the sale, rental or lease transaction involving the asset. Bid definition module 64 (best shown in FIG. 2) is configured to generate the bid definition 184 as follows. In one embodiment, bid definition module 64, when invoked by the user, prompts the user for a bid date 190, an availability date 192, and information defining the classes of users allowed to bid on the asset 194. The bid date 190 establishes the date when the asset is available for other users to bid on. The availability date 192 defines the date when the asset can be delivered.

Classes of users 194 includes a dealer class 196, and a member class 198. With respect to dealer class 196, a logical variable 200 is associated therewith, and may take either of the values "Y", indicating that dealers are allowed to bid on the asset, or "N", indicating that the dealers are not allowed to bid on the asset. As illustrated, logical variable 200 is a "Y", indicating that dealers may bid on the asset. Likewise, with respect to member class 198, a logical variable 202 is provided, and may also assume one of the values "Y" or "N". In the illustrated embodiment, users who are in the member class may also bid on the asset. It should be understood that other logical arrangements, such as the use of a logical "0" or logical "1" could also be used, being an equivalent thereof.

Bid definition 184 also includes, for each class of users, an identification of which of a sale, rental, or lease transaction is available to that class of user. As shown in FIG. 8, all three of a buy option 204, a lease option 206, and a rental option 208 are enabled for both classes of users (e.g., members and dealers). This is shown by a logical variable 210, (which are all set to "Y"). For each transaction type available to a user class, respective transaction characteristic data is obtained from the first user. For example, the transaction characteristic data for a sales transaction includes a list sales price, such as shown in column 214, and a minimum sales price that a second user (e.g., another dealer) must submit to define a valid bid, such as shown in column 212. The transaction characteristic data for a rental transaction includes a list rental price for a predetermined period of time (e.g., a month), and a minimum rental price for that predetermined period of time that the second user must submit in order to define a valid bid. Finally, the transaction characteristic data for a lease transaction includes a total lease amount, and a term.

In a constructed embodiment, the bid definition module 64 executes a bid definition wizard. The information obtained from the first user to populate the fields described above is obtained through a step-by-step process, which leads the user along, allowing the user to click on checkboxes to select the classes of users who will be allowed to bid, as well as what respective transactions will be available to that class of user. In addition, the bid definition wizard, as executed by bid definition module 64, allows direct entry of dates, and pricing, where appropriate.

Bid definition module 64 is also configured for storing the asset specification data and the bid definition in an asset profile in a market database 36 when all the needed bid definition information has been collected. This is shown in FIG. 8 by a double arrowhead line to database 36.

Having described what bid definition 184 is, and how bid definition module 64 operates to obtain such information, a description of the user's interaction with system 20 will now be set forth. To promote the greatest amount of flexibility for the user, electronic system 20 includes an asset configuration unit for preparing assets for posting and consignment. The asset configuration unit obtains the asset specification data and bid definition to form the asset profile, and comprises multiple interfaces/modules. These interfaces/modules include a create and define feature of market module 56, a sequence of the add-asset feature of fleet module 48 and the add-to-market feature of fleet search module 54, and the add-to-market feature of fleet search module 54 (for existing assets and shown in FIG. 2). These three approaches will be described in detail in-turn.

First, in a create and define feature, the asset specification data (including maintenance history data), as well as the bid definition are made by the first user directly out of market module 56. That is, when a first user, such as a dealer, wishes to post a piece of equipment on the electronic market, the first user, after logging in, initially selects the "STORE" button 88 (FIG. 3) from the user's start page 66, which invokes market module 56. Market module 56, as one of its available functions, would directly allow configuration of an asset (i.e., input of asset specification data including maintenance history data, as well as the bid definition). When completed, the asset is stored in the market database.

Second, if the user wishes to post an asset on the electronic market, but the asset does not presently "electrically" exist in one of the user's fleets, then the user can follow the "add asset" process described above in connection with FIG. 5. Once the asset is created "electrically", the user then "clicks" the "Add to Market" button.

Third, existing assets may be configured for posting as follows. A user, for example a dealer, who wishes to post the existing asset in market database 36, would invoke the fleet search module 54 by selecting the Search button 82. found on start page 66 (FIG. 3). FIG. 9 illustrates a search form that allows the user to search the user's fleets to identify assets based on specified search criteria. An identification of assets satisfying the criteria is returned by fleet search module 54. The user then selects the asset to be placed on the market. As shown in FIG. 9, this selection is done by selecting one of the radio buttons adjacent the desired asset, and then "clicking" the "Add to Market" button 215. Since the asset specification data for the selected asset is already stored in the fleet database 40, only bid definition 184 need be generated for the asset to prepare it for posting. "Clicking" on the "Add to Market" button 215 invokes the bid definition wizard, described above in connection with FIG. 8.

Through the foregoing functionality, electronic system 20 allows a user, such as a dealer, to consign an asset to an electronic market for rental, lease, and/or sale by a second user, such as another dealer. This functionality enables the first dealer to increase utilization of infrequently used pieces of equipment by making those pieces of equipment available to a larger audience of dealers and end-user customers. In addition, the second dealer realizes an increased virtual inventory of equipment from which to, preferably, rent (with a view towards sub-renting to an end-user customer).

In an alternative use of system 20, a non-dealer user of system 20, for example, an equipment leasing company, may purchase infrequently used equipment, for example, and make such equipment available through market database 36. The universe of dealers (with the dealers sub-renting the equipment to end-user customers) and end-users may have a sufficiently high aggregate need for such piece of equipment to justify the purchase and ongoing rental to third-parties. In this embodiment, the end-user customer need not be aware of the actual ownership of the equipment, and will look to the dealer for service, maintenance and the like.

End-of-Lease Disposal

A particular business type of user who may take particular advantage of electronic system 20 is one engaged in the business of financing the capital requirements of other companies. For example, such financing may involve the lease or rental of forklifts $22_1, \ldots, 22_n$ to the company who actually uses the forklifts in its business, and who pays a lease or rental fee. This type of user often has a large number of leases that may represent literally thousands of individual assets that are or will periodically be coming off of lease. Since this type of user has no direct use for such assets, such assets must be disposed of in an effective manner. The assignee of the present invention has determined that the information acquired during the tracking and management of the asset while the asset was being leased can be leveraged into a value proposition when such asset comes off of lease and must be disposed of. In particular, the assignee of the present invention has determined that keeping maintenance history data associated with assets on lease becomes a value-added feature when disposing of the asset in a fashion to be described in detail now.

FIG. 10 shows a market-search parameter input form 216 generated by market search module 58 configured to allow a search of market database 36. Assets that have been tracked and managed by tracking and management system 28 over an operating life (or portion thereof) have associated therewith a substantial amount of valuable information, including maintenance history data. When such assets come off of lease, the particular type of user described above (i.e., lessor) transfers these assets into market database 36. Each asset in market database 36 has an associated asset profile comprising both asset specification data (including maintenance history data) and a bid definition. Accordingly, since these end-of-lease assets already have the asset specification data defined, only a bid definition needs to be created. Completing the bid definition may be done manually for each asset, or may be automated through the use of a knowledgebase developed over time. Once the asset profiles for the end-of-lease assets are stored in market database 36, then the other users of electronic system 20 will be able to electronically search the market database, based on search parameters they specify, in anticipation of a purchase, rental or lease transaction.

Referring to FIG. 10, once such a user invokes market search module 58, search parameter input form 216 is displayed. Included in display 216 is a series of radio buttons: a lease radio button 218, a buy radio button 220, a rent radio button 222, and an "All" radio button 224. As illustrated, the lease radio button 218 has been selected; accordingly, all assets in market database 36 that are available for lease, and satisfy the other search parameters, will be identified and returned in an output display, shown in FIG. 11. It should be understood that the search results may be further limited based on the other search parameters like the class of user conducting the market search (e.g., whether the user is a "member" or "dealer", and whether a particular asset has been configured to be bid on by a "member" or "dealer"). Selecting the "All" radio button 224 results in a search that identifies all assets (i.e., not limited to any one transaction type). FIG. 10 also shows that a market search may be limited by a lower list price 226, an upper list price 228, as well as a plurality of further parameters, such as asset type, make/model, condition, year of manufacture, and availability date, as also illustrated. Once the user has defined the search, the market search is invoked by "clicking" the Search button 230.

FIG. 11 shows a screen output 232 of market search module 58. Output 232 includes an identification 234 of the assets satisfying the search parameters. In the illustrated embodiment, identification 234 includes a date available parameter, an asset description parameter, a make and model parameter, a capacity parameter, a year of manufacture parameter, a usage rating parameter, and a status parameter. The status data in the status parameter column, if any, is indicative of whether or not the asset has been sold. As shown in FIG. 11, status data 235 for the "Allegany Mega-8" asset indicates that it has been sold. Importantly, each asset, in an illustrated embodiment, is linked to a respective description, detailed in nature and which includes information beyond that contained in the simple identification. A user can "click" on the "Allegany Mega-8" wording that is underlined, and will be hyper-linked to its detailed description. Although not shown in FIG. 11, the detailed description of an asset may be substantially identical to the information illustrated in FIG. 6.

Screen output 232 further includes a Bid button 236, a plurality of radio selection buttons 238, a "New Search" button 240, and an "Add to Fantasy Fleet" button 242 having an associated pull down menu 244. Bid module 60 is configured to allow the user to select one of the assets identified in the market search for placement of a bid. To place a bid on an asset, the user first selects the asset using the radio buttons 238. Thereafter, the user "clicks" on Bid button 236, which invokes bid module 60. The Move or Add to fantasy fleet button 242 will be described in greater detail below in connection with the simulated fleet feature of the present invention.

FIG. 12 shows a screen output 245 generated by bid module 60. In a constructed embodiment, output 245 includes the detailed description of the asset, similar to FIG. 6, but which has been omitted from FIG. 12 for clarity. Bid module 60 provides transaction options: a purchase transaction option 246, a lease transaction option 248, and a rental transaction option 250. The desired transaction is selected by the user through the radio buttons. In the illustrated embodiment, a "Buy" transaction has been selected by the user.

When the selected transaction is a purchase transaction, bid module 60 is configured to prompt the user for a bid price offered for the selected asset, which is entered in input box 252. As used herein, the wording "prompt" merely means to provide a mechanism or means to accept the bid price, and does not suggest or require some active activity, such as a blinking input box, input wizard or the like.

When the selected transaction is a lease transaction, bid module 60 is further configured to prompt the user to select a lease term, a lease type, and a monthly lease amount offered for the selected asset. As illustrated in exemplary fashion in FIG. 12, the lease term may be input through a pull down menu 254, the lease type may be input through pull down menu 256, and the monthly lease amount may be entered (e.g., keyboard) in box 258. In a constructed embodiment, the lease term may be one of a 24 month, 36 month, 48 month, 60 month, and 72 month term. Further, in a constructed embodiment, the lease type may be one of a category 1, category 2, category 3, fixed-ten (10%) percent, fixed-twenty percent (20%), buyout-new, buyout-used, category 4, category 5, category 6, and category 7 type leases. Lease types may be totally configurable. Of course, other options may be used or offered to the user, depending on the asset, market conditions, etc. To facilitate the bidding process, bid module 60 further includes a lease calculator tool which may be invoked by "clicking" on the Lease Calculator button 262. The lease calculator tool allows the user to specify lease term and lease type, and enter a third parameter, either a monthly payment or a total lease amount, and have the lease calculator calculate a fourth parameter, the other one of the lease amount and monthly payment. The calculated amount can be directly transferred to the monthly lease amount box 258.

When the selected transaction is a rental transaction, bid module 60 is further configured to prompt the user for a monthly rental price offered for the selected asset, which may be entered in box 260. The user may submit the bid by "clicking" on the "Submit Bid" button 264.

Bid module 60 is further configured to generate a bid history (not shown) for each asset that has been posted in market database 36. The bid history comprises a listing of each bid made by the users of system 20 on a particular asset. The bid history includes a detail of the submitted bid (e.g., by whom, price offered, etc.). Bid module 60 is also configured to allow the user that posts the asset in the market database (e.g., the leasing company), to retrieve the bid history, to review the bids contained in the listing, and finally to accept one of the bids to thereby complete the offered transaction.

Through the foregoing, accumulated information acquired from the tracking and managing of assets can be leveraged to increase financial return when such assets come off of lease and must be disposed of.

Simulated ("Fantasy") Fleet

Conventional asset management systems lack effective tools for conducting "what if" analyses i.e., modeling a simulated fleet containing both actual assets and proposed assets. The invention overcomes the shortcomings inherent in conventional systems by providing an electronic system 20 for modeling a simulated fleet. For example, if two older machines, each with high maintenance costs, are replaced by two newer machines with lower maintenance costs, but with higher lease costs, what effect would such a change make on the overall performance of the fleet? The Fantasy Fleet simulator of the present invention enables computer-based modeling that assists answering such questions.

As shown in FIG. 3, a Fantasy Fleet may be created in the same manner as an actual fleet (a fleet with real assets). A fantasy fleet may be created by "clicking" on a Create button 108, which invokes the simulated fleet module 50, which in turn prompts the user to input a fantasy fleet name, as well as a location. Once the fantasy fleet has been created, assets may then be added.

To promote the greatest amount of flexibility possible, electronic system 20, to implement the "Fantasy" fleet feature, includes a simulated fleet configuration unit that comprises multiple interfaces/modules for setting up and adding assets to the fantasy fleet. These interfaces/modules include at least one of an add-asset feature of simulated fleet module 50, an add-to fleet feature via the fleet search module 54, an add-to-fleet feature via market search module 58, and a step-by-step entry system of the fleet builder module (not shown), accessible via the "Fleet Builder" button on the user's start page 66. Each will be described in turn.

First, the add-asset feature of simulated fleet module 50 may be used. A user may "click" on link 116 in FIG. 3, which causes simulated fleet module 50 to generate a screen output 266—an asset view—as shown in FIG. 13. The user interface illustrated in FIG. 13 operates in substantially the same manner as the user interface illustrated in FIG. 4 for assets contained in an existing fleet. For example, the user, by "clicking" on the "Add-Asset" button 268, causes simulated fleet module 50 to present an input data dialog, in accordance with the flowchart of FIG. 5, for adding an asset. The user then configures the asset in the same manner as described above for an existing fleet.

Second, the add-to-fleet feature of fleet search module 54 may be used. As shown in FIG. 9, a user can search his fleets by selecting search button 82 from the user's start page 66 (FIG. 3), which invokes fleet search module 54. The search results contain an identification of the assets that are available for selection. Selection may occur, for example, through the use of radio buttons, as shown in FIG. 9. The user may then select a destination simulated fleet through the use of pull down menu 270, and then add the chosen asset to the desired fantasy fleet by "clicking" on Add button 272.

Third, the add-to-fleet feature of market search module 58 may be used. The further method for adding assets to a fantasy fleet involves conducting a market search, using market search module 56, as illustrated in FIG. 10. Then, the user adds assets by selecting the desired destination fantasy fleet through pull down menu 244, and "clicking" on the Add button 242. Through this approach, items available in market database 36 may be added to the fantasy fleet.

Fourth, a user may use the fleet builder wizard to create a fantasy fleet and configure and add assets. The fleet builder wizard may be invoked by "clicking" on the "Fleet Builder" button 86 on the user's start page 66. This step-by-step entry system leads the user along, prompting for a fleet name, and location, an indication that it is a fantasy fleet, and prompts to add an asset. The add asset feature of the "fleet builder" dialog is substantially the same as the "add asset" feature of the current fleet module 52, described above (e.g., FIG. 5).

FIG. 14 shows a report 274 generated by reporting and analysis module 62. In particular, each asset listed in the report has an associated plurality of parameters, such as average monthly usage hours, total maintenance cost, hourly maintenance cost, total lease cost, total operating cost, total hourly cost, percent utilization, etc. A user can invoke the reporting and analysis module 62 by selecting the Reporting button 92 from the "start" page 66 shown in FIG. 3. The user may then select the target fleet (existing or fantasy) for which the report(s) will be generated. A user can evaluate changes made to an existing fleet by generating a report for an existing fleet, configuring a simulated fleet reflecting the proposed changes, and then generating a second report.

The two reports can be compared and decisions made based on the results of the comparison. In the report shown in FIG. 14, the assets enclosed by dashed-line box 276 are part of an existing fleet for which a report (not shown) has already been or will be generated by module 62. The assets shown in dashed-line box 278 are proposed additions to the existing fleet. The combination of the assets in dashed-line box 276, and dashed-line box 278 constitute the simulated or fantasy fleet. One exemplary parameter is total hourly cost 280. Reporting and analysis module 62 is configured to generate report 274 having a composite output 282 that is characteristic of all the assets in the simulated fleet. The composite total hourly cost 282 can then be compared to the corresponding total hourly cost for the existing fleet (in the other report) to make an evaluation of the proposed changes. Another composite output shown in FIG. 14 is percent utilization 284. It should be appreciated that some of the composite parameter values are determined by reporting and analyzing module 62 according to an arithmetic sum function, such as the total maintenance cost parameter. Reporting and analyzing module 62 is further configured to determine other composite parameters, such as hourly maintenance cost, utilization, and total hourly cost, according to an arithmetic average function. The parameters dealing with money amounts (e.g., dollars) required or desirable to make an asset acquisition determination may be characterized as a financial figure of merit. Other parameters, such as utilization percent, may be characterized as a performance figure of merit.

To the extent that the specific assets included in the simulated fleet have actual usage, performance, utilization, and cost data associated therewith, then such information is used by reporting and analyzing module 62 in computing composite values. However, when the assets are of the type that have no asset-specific data associated therewith, then profiled asset specification data is used in performing the analysis. Additionally, when preconfigured assets from preconfigured database 42 are included in a simulated fleet (or in an actual fleet), then composite data for assets of a similar type are used by module 62 for analysis purposes.

In accordance with the provisions of the patent statutes, the principle and mode of operation of this invention have been explained and illustrated in several preferred embodiments.

However, it must be understood that this invention may be practiced otherwise than as specifically explained and illustrated without departing from its spirit and scope.

What is claimed is:

1. An electronic system for facilitating transactions comprising:
   a first database configured to store information associated with a plurality of assets;
   a market search module configured to search said first database based on search parameters specified by a user in anticipation of at least one of a purchase, rental and lease transaction, said market search module being further configured to generate an identification of assets according to said search parameters, wherein one of said identified assets has a description that includes maintenance history data, said maintenance history data including a history of discrete maintenance jobs for a particular asset, said maintenance history data being distinct from an asset condition, and further wherein the description also includes a subset of date-in-service data and preventative maintenance (PM) hours threshold data; and
   a communications interface for facilitating electronic remote access of said system by said user.

2. The system of claim 1 further including a tracking and management system configured to track at least one of said assets and acquire said maintenance history data therefor.

3. The system of claim 1 further including a bid module configured to allow said user to select one of said identified assets for placement of a bid thereon, said bid module being further configured to provide selectable purchase, rental and lease transaction options in response to said selection for bid.

4. The system of claim 3 wherein said lease transaction is selected by said user, said bid module being further configured to receive a lease term and lease type selection, and a total lease amount from said user.

5. The system of claim 4 wherein said bid module includes a lease calculator tool configured to output a selected one of a monthly lease amount and a total lease amount.

6. The system of claim 3 wherein said rental transaction is selected by said user, said bid module being further configured to receive a monthly rental price from said user.

7. The system of claim 4 wherein said bid module is further configured to allow said user to select one of a month-to-month rental arrangement and a fixed term rental arrangement.

8. The system of claim 3 wherein said information stored in said first database comprises an asset profile for each one of said plurality of assets, said asset profile including asset specification data and a bid definition defining parameters associated with said purchase, rental and lease transactions, said bid module being configured to determine whether said bid made by said user is valid using said bid definition.

9. The system of claim 1, wherein said history includes financial parameters.

10. The system of claim 9, wherein said financial parameters includes a specific cost associated with a particular one of said jobs.

11. The system of claim 9, wherein said financial parameters represents an overall maintenance cost of said asset.

12. The system of claim 11, wherein said overall maintenance cost is one of a total maintenance cost and an average maintenance cost.

13. The system of claim 1, wherein said history includes a job listing.

14. The system of claim 13, wherein said job listing includes a job date and description.

15. The system of claim 14, wherein said identification further includes a specific cost for each said job.

16. The system of claim 1, further including information concerning asset condition, said maintenance history data and said asset condition being used to help determine an asset price.

17. The system of claim 1, further comprising a second database not accessible to said first database; wherein said particular asset is tracked during a portion of an operating life thereof, said maintenance history being acquired during said portion of said operating life, and stored in said second database; and wherein said stored maintenance history is transferred to said first database when said asset is being offered for one of purchase, rental and lease.

18. An electronic system for facilitating transactions to dispose of assets comprising:
   a market database configured to store information associated with a plurality of assets;
   a market search module configured to search said market database based on search parameters specified by a user in anticipation of at least one of a purchase, rental and lease transaction, said market search module being further configured to generate an identification of assets according to said search parameters, said search module being further configured to allow said user to select a first one of said identified assets for obtaining a description comprising information beyond that in said identification and including maintenance history data, said maintenance history data including a history of discrete maintenance jobs for a particular asset, said maintenance history data being distinct from an asset condition, wherein the description also includes a subset of date-in-service data, preventative maintenance (PM) data, and warranty data;
   a bid module configured to allow said user to select a second one of said identified assets for placing a bid thereon, said bid module being further configured to provide purchase, rental and lease transaction options for selection by said user and to receive said bid; and
   a communications interface for facilitating electronic remote access by said user.

19. The system of claim 18 wherein said first one and said second one of said identified assets are different.

20. The system of claim 18 wherein said first one and said second one of said identified assets are the same asset.

21. The system of claim 18 further including:
   a tracking and management system configured to track said assets and acquire said maintenance history data therefor, and store said maintenance history data therefor and store said maintenance history data in said market database.

22. The system of claim 18 wherein said search parameters include at least one of an availability for purchase, an availability for lease, an availability for rental, all assets available for any one of purchase, lease and rental, a lower asset list price, an upper asset list price, an asset type, an asset make/model, an asset condition, an asset model year, and an asset availability date.

23. The system of claim 18 wherein said description includes status data indicative of whether a respective one of said assets has been sold.

24. The system of claim 18 wherein said description includes asset availability date data.

25. A method for disposing of assets, comprising the steps of:
   (A) providing a market database configured to store information associated with a plurality assets;

(B) searching the market database to identify assets satisfying search parameters specified by a user in anticipation of at least one of a purchase, rental and lease transaction;

(C) generating an output that includes an identification of assets identified in said searching step;

(D) generating a description comprising maintenance history data for a first one of the identified assets selected by the user, said maintenance history data including a history of discrete maintenance jobs for a particular asset, said maintenance history data being distinct from an asset condition;

(E) electronically communicating the description to the user wherein the user is remotely located; and (F) receiving a bid from the remote user for one of the purchase, rental and lease transaction of a second one of the identified assets.

26. The method of claim 25 further comprising the step of:
receiving an acceptance of the bid from an owner of the bid-on asset.

27. The method of claim 25, further comprising the steps of:
purchasing one of said plurality of assets in a new condition;
tracking said one asset during an initial portion of an operating life thereof;
acquiring maintenance history data associated with said one asset during said initial portion;
storing the acquired maintenance history data in a fleet database; and
transferring said stored maintenance history data to said market database when said asset is being offered for one of purchase, rental and lease.

* * * * *

UNITED STATES PATENT AND TRADEMARK OFFICE
CERTIFICATE OF CORRECTION

| | | |
|---|---|---|
| PATENT NO. | : 7,395,275 B1 | Page 1 of 1 |
| APPLICATION NO. | : 09/503671 | |
| DATED | : July 1, 2008 | |
| INVENTOR(S) | : Brent C. Parent et al. | |

It is certified that error appears in the above-identified patent and that said Letters Patent is hereby corrected as shown below:

Column 21, line 43 - delete "4" and insert --6--

Signed and Sealed this

Nineteenth Day of August, 2008

JON W. DUDAS
*Director of the United States Patent and Trademark Office*